United States Patent
Rance

(10) Patent No.: US 6,468,415 B1
(45) Date of Patent: Oct. 22, 2002

(54) ELECTROCHEMICAL DISSOLUTION

(75) Inventor: Peter Jonathan Watson Rance, Seascale (GB)

(73) Assignee: British Nuclear Fuels Plc (GB)

( * ) Notice: Subject to any disclaimer, the term of this patent is extended or adjusted under 35 U.S.C. 154(b) by 0 days.

(21) Appl. No.: 09/807,656

(22) PCT Filed: Oct. 22, 1999

(86) PCT No.: PCT/GB99/03427

§ 371 (c)(1),
(2), (4) Date: Sep. 21, 2001

(87) PCT Pub. No.: WO00/25321

PCT Pub. Date: May 4, 2000

(30) Foreign Application Priority Data

Oct. 22, 1998 (GB) .............................. 9823046

(51) Int. Cl.[7] .............................. G21C 19/38
(52) U.S. Cl. ......................... 205/704; 205/43
(58) Field of Search .................. 205/704, 43

(56) References Cited

U.S. PATENT DOCUMENTS 2,951,793 A * 9/1960 Hansen
4,814,046 A * 3/1989 Johnson et al.
5,009,752 A * 4/1991 Tomczuk et al.
5,531,868 A * 7/1996 Miller et al.

FOREIGN PATENT DOCUMENTS

| DE | 15 33 097 a | * 12/1969 |
| EP | 0 503 557 a | * 9/1992 |

OTHER PUBLICATIONS

Patent abstracts of Japan, vol. 015, No. 242 (p–1217), Jun. 21, 1991 & Jp 03 075595.*
Caracciolo, et al., "Electrolytic Dissolution of Power Reactor Fuel Elements," *Progress in Nuclear Energy.* Series III, vol. IV, 1970, pp. 81–118 (no month).

* cited by examiner

Primary Examiner—Arun S. Phasge
(74) Attorney, Agent, or Firm—Myers Bigel Sibley & Sajovec

(57) ABSTRACT

A process for the electrochemical dissolution of a metallic structure having a plurality of electrically conducting components comprises utilising the structure as a sacrificial electrode in an electrochemical cell so as to dissolve at least part of the strcuture. The process is characterised in that, prior to the use of the structure as a sacrificial electrode, molten metal is allowed to solidify about the structure so as electrically to connect together the components.

11 Claims, No Drawings

ELECTROCHEMICAL DISSOLUTION

CROSS-REFERENCE TO RELATED APPLICATIONS

The present application is a U.S. national phase application of PCT International Application No. PCT/GB99/03427, having an international filing date of Oct. 22, 1999 and claiming priority to Great Britain Application No. 9823046.9 filed Oct. 22, 1998. The above PCT International Application was published in the English language and has International Publication No. WO 00/25321.

FIELD OF THE INVENTION

The present invention concerns electrochemical dissolution. By way of example, the present invention relates to the reprocessing of irradiated nuclear fuel and, by way of particular example, to the dissolution of nuclear fuel assemblies. Reference will be made hereinafter to the dissolution of nuclear fuel assemblies but it should be understood that the present invention has application to the dissolution of other structures including those which are radioactive as well as non-radioactive structures.

BACKGROUND OF THE INVENTION

A nuclear fuel assembly typically includes a plurality of fuel rods or pins which are assembled together within a skeleton of grids. Each fuel rod or pin may typically be in the form of a carrier tube made of a suitable material such as the zirconium metal based alloy known as Zircaloy. Within the carrier tube is located a "stack" of nuclear fuel pellets.

In a known commercial method of reprocessing of irradiated (spent) nuclear fuel, the pins of an assembly are chopped up prior to dissolution of the uranium dioxide fuel pellets in nitric acid. The pins must be chopped up to expose the pellets to nitric acid because the bulk zirconium alloy is resistant to attack by nitric acid, as is an oxide skin or film which is present on the irradiated zirconium alloy. The chopping up of the pins is undesirable because it requires mechanical apparatus which becomes subject to serious wear and therefore requires relatively frequent repair. It will be appreciated that there are difficulties in repairing machinery which is used for the processing of radioactive material.

In a period between the 1950s and 1970 considerable experimental work was carried out on the electrochemical dissolution ("ECD") of complete (unchopped) fuel pins. A review of the development of ECD up to 1970 can be found in V P Caracciolo and J H Owen, progress in nuclear energy, Series III. Vol IV. Pergamon Press 1970, pp 81–118. The principle of ECD is that a fuel pin is placed in nitric acid and a potential difference is applied between the fuel cladding and the nitric acid surrounding it. If this potential is large enough then the inert nature of the cladding is overcome and it becomes reactive to the nitric acid.

Caracciolo and Owen describe a process in which the fuel pins are placed in wedge-shaped baskets whose sides taper towards each other towards the bottom of the basket. The basket is placed in nitric acid and is connected to a power supply. However, as the dissolution process is an oxidative one, contact between the metallic basket and the oxidising assembly is lost resulting in cessation of the process. Furthermore, the process has only been demonstrated on stainless steel clad fuel and would not work with Zircaloy clad fuel because the oxide film prevents electrical contact between basket and fuel assembly.

In addition to the problem posed by the pre-existing oxide film, there is also the problem that, due to the large number of fuel pins in an assembly, it is difficult to form adequate electrical contact to all the pins during the process. A pressurised water reactor (PWR) assembly can include up to 324 pins in an 18×18 matrix assembly. Attempts made to form direct electrical contact with the fuel assembly have all failed due to the problem of forming contact all pins in the assembly.

STATEMENTS OF INVENTION

According to the present invention there is provided a process for the electrochemical dissolution of a metallic structure having a plurality of electrically conducting components, the process comprising utilising the structure as a sacrificial electrode in an electrochemical cell so as to dissolve at least a part of the structure, characterised in that, prior to use of the structure as a sacrificial electrode, molten metal is allowed to solidify about the structure so as electrically to connect together said components.

In the case where the metallic structure is a fuel assembly, one end of the assembly is lowered into a vessel containing molten metal. The molten metal is allowed to cool as a result of which a block of metal is cast around the end of the fuel pins held in the assembly. The fuel assembly is then lowered into the electrolyte liquid contained within an electrochemical cell with the cast metal block uppermost. During the operation of the electrochemical cell, the fuel pins dissolve into the electrolytic liquid and, as this happens, the fuel assembly may be further lowered into the cell until it is essentially all consumed.

The metal block may be formed from stainless steel which is the material used at that end of the fuel assembly having guide nozzles for regulating water flow through the assembly. The block of metal may typically extend for a length of about 10 cms.

By utilising a cast metal block at one end of the fuel assembly, electrical contact can then be simply made to the cast block itself which in turn connects to each fuel pin. In general the material used for casting must be electrically conducting. It should also, in the particular case of oxidised fuel assemblies, melt at a high enough temperature for the diffusion of oxygen from the oxide layer on the outside of the fuel pins into the molten melt to occur at a fast enough rate. However the melting temperature should not be so high that embrittlement or melting of the cladding itself takes place.

In a particular embodiment of the invention stainless steel is melted in a graphite crucible to achieve the appropriate balance of melting temperature and reducing conditions since some of the graphite dissolves in the stainless steel giving it a "reducing" nature. In another embodiment, a higher carbon content steel is used, thereby removing the need for a graphite furnace.

The temperature to which the molten metal is raised is chosen to give good fusion bonding between the metal structure and the molten metal but with the avoidance of a temperature which is so high that embrittlement takes place or, in extreme cases, penetration of the metal structure by the molten metal. In the case where the molten metal is stainless steel which is melted in a graphite crucible and the metal structure is a fuel assembly including Zircaloy cladding, the temperature was between 1350° and 1420° C. preferably between 1375° and 1395° C. and most preferably about 1385° C.

Preferably, the metallic structure is substantially fully immersed into the molten metal prior to solidification thereof. Preferably, the molten metal is then cooled at a rate of at least 50° C. min$^{-1}$, more preferably at least 100° C. min$^{-1}$ and most preferably about 200° min$^{-1}$.

DESCRIPTION OF PREFERRED EMBODIMENTS

A number of commissioning tests were performed to ensure that the furnaces used, which are radio frequency (RF) furnaces, function correctly and there is compatibility between the Zircaloy cladding and the molten stainless steel. In addition commissioning tests also involved resistance measurements on lengths of cladding which had been oxidised in air to produce an oxide layer having a thickness of approximately 20 $\mu$m. The tests showed that the stainless steel started to melt at approximately 1250° C., that is to say, at a considerably lower temperature than its specified melting point range of 1400–1455° C.

The tests also demonstrated that the high resistance of the zirconium oxide (>2 M$\Omega$) is eliminated, the resistance dropping to 0.1$\Omega$ before the stainless steel begins to melt.

A test carried out in a graphite crucible without the presence of stainless steel revealed that zirconium oxide is reduced on heating in a pure argon/carbon monoxide atmosphere.

In addition the tests demonstrated that Zircaloy reacts strongly with molten stainless steel at 1500° C. resulting in penetration of the stainless steel melt inside the Zircaloy cladding and severe interaction between the two alloys. The microstructure of both the stainless steel and the Zircaloy cladding is altered. The steel structure consisted of austenite grains in a complex eutectic mixture with inclusions of graphite flakes. The Zircaloy structure had an $\alpha$-Zr layer in the outer surface and columnar grains at the remaining inside thickness. There was also a layer of intermetallic compounds at the Zircaloy/stainless steel interface. In some tests the cladding had cracked at the stainless steel miniscus region due to the complex interaction in molten stainless steel, that is to say, differential contraction between the two alloys on cooling and hoop stresses generated in the Zircaloy cladding as a result of oxygen diffusion to form an $\alpha$-Zr layer. The shape of the Zircaloy cladding within the solidified steel was no longer round but heavily convoluted and the cladding was reduced in thickness.

Tests were carried out at 1255, 1310, 1358 and 1415° C. to determine the optimum temperature for reduction of the zirconium dioxide and to develop a good fusion bond between the Zircaloy and the stainless steel. The results showed that, although the resistance had dropped to a minimum value (approximately 0.02$\Omega$) in all cases, there was a lack of fusion bonding at temperatures of 1255 and 1310° C. The tests performed at 1358 and 1415° C. show both elimination of the oxide layer and good fusion bonding between the two alloys. Accordingly, the optimum temperature was selected to be about 1385° C. (midway between 1358 and 1415° C.) to ensure good fusion bonding and minimised embrittlement of the cladding.

Further tests were performed on single cladding lengths with differing oxide thicknesses (15, 19, 36 and 42 $\mu$m) at 1385° C. In all cases the high resistance due to the zirconium dioxide layer dropped to 0.1$\Omega$ before the stainless steel began to melt. Subsequent to the stainless steel melting, there was a very small further drop in resistance probably due to dissolution of the residual oxide layer on the Zircaloy clad surface. A minimum resistance of around 0.025$\Omega$ was attained in all cases before the temperature was raised to 1385° C. There was no systematic relationship between the oxide thickness and the temperature to achieve a minimum; even the cladding with the maximum oxide thickness (42 $\mu$m) achieved the minimum resistance at a similar temperature. A visual metallographic examination of the samples after the tests indicated complete melting of the stainless steel and good fusion bonding between the Zircaloy and the stainless steel.

In a further test a small model fuel assembly (comprising a 3×3 matrix of Zircaloy cladding lengths) was heated to a melt temperature of about 1385° C. Movement of the rod assembly (supporting the nine cladding lengths) to one side of the graphite crucible occurred at about 1300° C. indicating the bulk melting of the stainless steel block. A rapid drop in resistance from above 2 M$\Omega$ to less than 0.1$\Omega$ occurred in the temperature range between 1000 and 1260° C. Subsequently the resistance continued to drop very slowly with temperature until a minimum value of 0.025$\Omega$ was recorded at 1350° C. There was no further drop in resistance during heating to the target temperature of 1385° C. After the test, it was found that the steel had melted around all the Zircaloy lengths and there was good contact between the two alloys. One cladding length had broken near the meniscus region and two lengths showed two cracks in the same region, the rest remaining intact.

In order to limit embrittlement of the cladding melt interface, the experimental technique was modified to hold the cladding partially immersed in the stainless steel block during the heating and melting process. Immediately before cooling begins the cladding is fully immersed into the melt. In this way the top length of the cladding with limited embrittlement is encased by the stainless steel cast, thus reducing the tendency to fracture at the gas/melt interface. The minimum resistance criterion is met by the lower part of the Zircaloy cladding, which is fully fused in the stainless steel.

Two Tests were Carried Out:

Test 1: Heating to 1370° C. at 200° min$^{-1}$, hold time 2 minutes and cooling at ~200° C. min$^{-1}$ ie furnace turned off.

Test 2: Heating to 1370° C. at 200° C. min$^{-1}$, hold time 2 minutes and cooling at 50° C. min$^{-1}$.

In order to allow partial immersion of the cladding during the heating and melting process and subsequent full immersion at the target temperature, some alterations were made to the RF furnace components. The stainless steel block was redesigned ie a 38 mm deep bore was drilled in the top length to immerse the cladding partially during the heating and melting process and the bottom 12 mm length was a solid block to allow the full immersion (further immersion by 10 mm) after melting. The graphite cubicle was dished at the top part to accommodate the molten metal ejected during the full immersion. The top plate of the furnace was provided with double seal entry to allow the gas tight movement of the cladding during the full immersion of the cladding at the final stage.

The experimental technique involved heating the Zircaloy tube having an oxide layer ~30 $\mu$m, and stainless steel contained in a graphite crucible using a R F furnace. As open-ended tubes were provided, a plugging devise (alumina pellet) is inserted in the bottom of the tubes to minimise entry of the stainless steel melt during the test. The conductivity across the cladding/melt interface is measured in each case. The melt temperature (graphite inside temperature) was monitored by a thermocouple located inside a closed end alumina tube, inserted into a bore drilled in the crucible wall thickness just next to the stainless steel surface. Another similar thermocouple was set up to measure the temperature near the bottom end of the stainless steel block (at a mid position of 12 mm long solid stainless steel end). The inside of the cladding is flushed with helium gas during each test in order to exclude any residual oxygen.

For both tests the resistance had decreased to a lower value of 0.1Ω before melting of the stainless steel had initiated. The decrease in resistance occurred very rapidly in the temperature range of 1150 to 1300° C. Below this temperature range the $ZrO_2$ resistance was out of the resistance measurement range (>2 MΩ), and the system produced erratic resistance values. In both the tests gas, possibly $CO/CO^2$, was observed sparging through the molten stainless steel, and this effect was more pronounced and lasted longer for test 2. There were no surface cracks at the gas/melt interfaces or failure of the Zircaloy cladding during post test handling. However, a longitudinal crack appeared after test 1, 20 mm below the gas/melt interface; and a circumferential crack after test 2, 10 mm below the gas/melt interfaces (at the sites of cavities in the stainless steel cast). No stainless steel was observed inside the Zircaloy tubes after the tests.

In test 1, the resistance dropped to 0.1Ω at 1275° C. and continued to drop very slowly with temperature until a minimum value of 0.032Ω was recorded at the target melt temperature (~1370° C.). The resistance value stayed almost constant on cooling the sample to room temperature.

After the test, it was found that the steel had melted around the Zircaloy cladding and there was good contact between the two materials. There was no sign of cracking in the region of the gas/melt interface. The ejection of molten metal onto the dished part of the graphite crucible during the full immersion of the cladding indicated that the stainless steel had been fully molten.

In test 2, the resistance dropped to 0.1Ω at 1290° C. and continued to drop very slowly with temperature until a minimum value of 0.025Ω was recorded at the target melt temperature. The resistance value increased slightly to 0.029Ω on cooling the sample to room temperature.

After the test, it was found that the steel had melted around the Zircaloy cladding and there was good contact between the two materials. There was no sign of cracking in the region of the gas/melt interface. The ejection of molten metal onto the dished part of the graphite crucible during the full immersion of the clad indicated that the stainless steel had been fully molten.

The samples for metallographic examination from each test were selected from two different positions; a transverse section at a position on the tip of the inner thermocouple and a longitudinal section at the gas/melt interface. The results of transverse sections show that there was good fusion bonding between the Zircaloy cladding and stainless steel (in both cases); however, in some areas (especially in the case of test 2) the contact between the two was lost due to the cavities in the melt. The photomicrographs show that the microstructure of the solidified stainless steel consisted of light and dark phases in the form of acicular (both light and dark phases) and polygonal (usually dark phases) grains. Coarse graphite flakes were also found within the mixture of the light and dark phases. The graphite flake size depends on the cooling rate, the faster the cooling rate the smaller the size. The Zircaloy had recrystallised with single grains traversing the cladding wall. The recrystallised grains also seemed to have a eutectic phase between them.

The micrographs show three distinctive layers across the stainless steel Zircaloy interface; a thin layer (~5 μm thick) next to the stainless steel surface, an adjacent smooth layer (α-Zr(O) (~90 μm thick) grown into the Zircaloy matrix and an intermetallic layer (~15 μm thick) at the α-Zr(O)/Zircaloy interface.

The results of longitudinal sections show that there was a lack of fusion bonding between the Zircaloy cladding and stainless steel (in both cases, in a small depth studied up to 3.5 mm) near the gas/melt interface due to the presence of unreduced $ZrO^2$ at the stainless steel/Zircaloy interface. The presence of $ZrO_2$ was patchy and to a lesser extent in test 2 (than in test 1) which seems to be due to the slow cooling rate and hence the longer reaction time. However, the resultant improvement in embrittlement was better in test 1 as evidenced by topography of tiny cracks; the cracks being wider and longer in the case of test 2 than in test 1 at the Zircaloy cladding surface around the gas/melt interface.

As has been indicated above, the present invention has application to the electric chemical dissolution of any metallic object, in particular to metallic assemblies where it is difficult to ensure good electrical conduct to all the parts of the assembly.

What is claimed is:

1. A process for the electrochemical dissolution of a metallic structure having a plurality of electrically conducting components, the process comprising utilising the structure as a sacrificial electrode in an electrochemical cell so as to dissolve at least a part of the structure, characterised in that, prior to use of the structure as a sacrificial electrode, molten metal is allowed to solidify about the structure so as electrically to connect together said components.

2. A process according to claim 1 in which the metallic structure is a spent nuclear fuel assembly.

3. A process according to claim 2 in which the molten metal is allowed to solidify about one end of the assembly and the assembly is then used as a sacrificial electrode with that end positioned uppermost and the other end extending into the cell electrolyte.

4. A process according to claim 2 in which the fuel assembly includes a plurality of pins each being coated with an oxide film.

5. A process according to claim 2 in which the fuel assembly includes a plurality of Zircaloy clad pins.

6. A process according to claim 1 in which the molten metal is stainless steel.

7. A process according to claim 6 in which the molten metal is at a temperature between 1350° and 1420° C.

8. A process according to claim 7 in which the molten metal is a temperature between 1375° and 1395° C.

9. A process according to claim 7 in which the molten metal is a temperature of the order of 1385° C.

10. A process according to claim 1 in which the metallic structure is substantially fully immersed into the molten metal prior to solidification thereof.

11. A process according to claim 10 in which, after said full immersion, the molten metal is cooled at a rate of at least 100° C. $min^{-1}$.

* * * * *